No. 742,099. PATENTED OCT. 20, 1903.
W. R. THOMPSON.
INDICATING DEVICE.
APPLICATION FILED APR. 2, 1903.
NO MODEL.

WITNESSES:
H. L. Reynolds
Thomas F. Hastings

INVENTOR
William R. Thompson.
BY
Emerson R. Ewell
ATTORNEY

No. 742,099.	Patented October 20, 1903.

UNITED STATES PATENT OFFICE.

WILLIAM R. THOMPSON, OF SOUTH NORWALK, CONNECTICUT, ASSIGNOR TO GEORGE N. McKIBBIN, OF SOUTH NORWALK, CONNECTICUT.

INDICATING DEVICE.

SPECIFICATION forming part of Letters Patent No. 742,099, dated October 20, 1903.

Application filed April 2, 1903. Serial No. 150,714. (No model.)

*To all whom it may concern:*

Be it known that I, WILLIAM R. THOMPSON, a citizen of the United States, residing at South Norwalk, Connecticut, have invented certain new and useful Improvements in Indicating Devices, of which the following is a clear, full, and exact description.

My invention relates to a fluid-indicating device; and my object is to provide a construction which will automatically indicate the direction of flow of a current in a pipe.

My invention will be defined in the claims.

Figure 1:
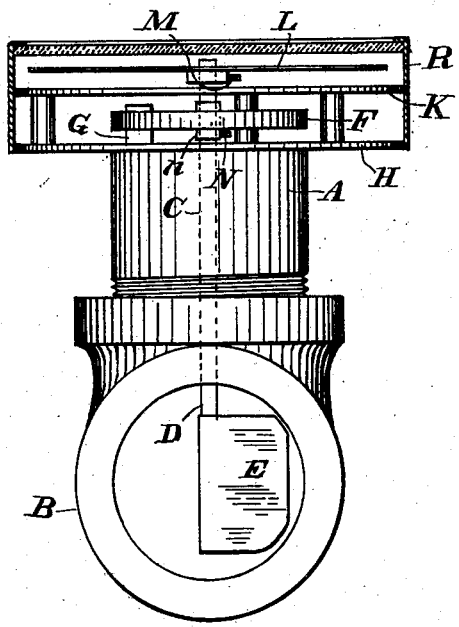
Figure 2:
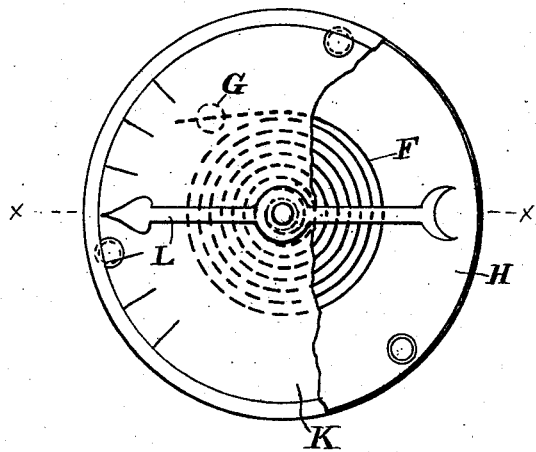

In the drawings, which show the preferred embodiment of my invention, Figure 1 is a side elevation, partly in section on the line $xx$ of Fig. 2; and Fig. 2 is a plan view.

In the preferred embodiment illustrated, A is a plug, screw-threaded at one end, as shown, and adapted to be screwed into a hole in a pipe or coupling B in which a current of fluid flows. The plug has a hole C therein, preferably entirely through the plug, as shown. D is a rotatable shaft located in said hole and preferably projecting from both ends of said plug. E is a vane attached to and standing laterally of the projecting lower end of said shaft. The vane preferably does not project laterally beyond said threads of the plug, so that it may be inserted through said hole while in place on the plug and without the necessity of adjusting it or attaching it after the plug has been screwed into place.

F is a coiled spring attached at one end to shaft D and at the other end adjustably fixed in a slot in a post G, fixed to a plate H, fastened to the upper end of the plug. This spring holds the vane in position laterally of the axis of the pipe, as shown, while allowing it to move in either direction.

K is a dial carried by plate H, and L is a pointer which is connected with the same, so as to be moved with the same, and is preferably fixed on shaft D itself, as shown. Graduations may be provided on the dial, as shown, if desired; but these are not essential.

M is a set-screw for adjustably fixing the pointer to the shaft, and $n$ is a hub adjustably fixed on the shaft by screw N, to which one end of the spring is attached. A glass-covered casing R may be provided, if desired.

The vane stands as shown when no current is flowing in the pipe; but as soon as a flow is set up the vane and pointer will be moved in one direction or the other, and the pointer will indicate in which direction the current is flowing, and as the vane and pointer will be moved to a greater or less degree, according as the current is strong or weak, the pointer will also automatically indicate the strength of the flow and roughly the amount of water passing through the pipe in a given time.

This indicator is useful in many places, but particularly in the pipe leading from the injector-pump of a boiler, as it automatically indicates to the engineer whether or not the pump is working properly and the boiler is being supplied with a proper amount of water.

I am aware that many variations from the construction shown may be made without departing from my invention as claimed, and I therefore do not limit myself to the particular embodiment illustrated and described herein.

What I claim is—

1. In a fluid-indicating device in combination, a plug screw-threaded at one end and adapted to be screwed into a pipe and having a hole therein, a shaft located and rotatable in said hole and projecting from the threaded end of said plug, a vane attached to and standing laterally of said projecting end, a spring resiliently holding said vane in one position, and a pointer connected with said shaft and moved by said vane.

2. In a fluid-indicating device in combination, a pipe having a screw-threaded hole therein, a plug screw-threaded at one end and screwed into said hole, said plug having a hole therein, a shaft located and rotatable in said latter hole and projecting from the threaded end of said plug, a vane attached to and standing laterally of said projecting end, a spring resiliently holding said vane in position laterally of the axis of said pipe, and a pointer connected with said shaft and moved by said vane.

3. In a fluid-indicating device in combination, a plug adapted to be inserted at its lower end into a hole in a pipe and having a hole therein, a shaft located and rotatable in said hole in said plug and projecting from said lower end thereof, a vane attached to and standing laterally of said projecting end and not projecting laterally beyond the side of said plug, a spring resiliently holding said vane in one position, and a pointer connected with said shaft and moved by said vane.

4. In a fluid-indicating device in combination, a plug screw-threaded at one end and adapted to be screwed into a pipe, said plug having a hole through the same from end to end, a rotatable shaft located in said hole and projecting from both ends of said plug, a vane attached to the end of said shaft which projects from the threaded end of said plug, said vane standing out laterally of said shaft, a spring connected with the other projecting end of said shaft and resiliently holding said vane in one position while allowing it to move in either direction, and a pointer carried by said latter projecting end of said shaft whereby it is moved by and correspondingly with said vane.

Signed at New York, N. Y., this 30th day of March, 1903.

WILLIAM R. THOMPSON.

Witnesses:
EMERSON R. NEWELL,
O. P. METCALF.